US006425762B1

(12) United States Patent
Ernst (10) Patent No.: US 6,425,762 B1
(45) Date of Patent: Jul. 30, 2002

(54) SYSTEM AND METHOD FOR COSIMULATION OF HETEROGENEOUS SYSTEMS

(75) Inventor: Johannes Ernst, Sunnyvale, CA (US)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/028,970

(22) Filed: Feb. 24, 1998

(51) Int. Cl.$^7$ .............................................. G09B 19/16
(52) U.S. Cl. ............................ 434/29; 434/30; 434/37; 703/4; 703/6
(58) Field of Search ................................ 434/118, 362, 434/219, 224, 365, 307 R, 29, 30, 37, 60, 61, 62; 345/952, 473

(56) References Cited

U.S. PATENT DOCUMENTS

| | | | |
|---|---|---|---|
| 5,240,416 A | * 8/1993 | Bennington | 434/30 X |
| 5,247,650 A | 9/1993 | Judd et al. | |
| 5,539,704 A | * 7/1996 | Doyen et al. | 367/73 X |
| 5,757,678 A | * 5/1998 | Leeke | 364/578 X |
| 5,838,948 A | * 11/1998 | Bunza | 703/27 X |
| 5,863,203 A | * 1/1999 | Bragdon | 434/29 X |
| 5,926,403 A | 7/1999 | Ho et al. | 364/578 |
| 5,960,186 A | * 9/1999 | Jones et al. | 395/500.25 X |
| 6,106,298 A | * 8/2000 | Pollak | 434/29 X |

* cited by examiner

*Primary Examiner*—Joe H. Cheng
*Assistant Examiner*—Chanda Harris
(74) *Attorney, Agent, or Firm*—Pennie & Edmonds LLP

(57) ABSTRACT

A cosimulation system formed from a hierarchy of simulation objects. Each simulation object, other than the root object, is coupled to a respective parent simulation object by a respective, individual parent-child binding. Each parent-child binding defines a source in the respective parent simulation object for each input signal associated with the respective child simulation object, and also specifies a destination in the parent simulation object for each output signal generated by the child simulation object. Synchronization of simulation objects is handled on an individual parent-child basis, rather than a global basis. Each of the simulation objects has an interface for communicating with its respective children and parent simulation objects. These interfaces all use the same predefined protocol, and send messages to each other via a common protocol communications medium. Some simulation objects include a watchdog module for stopping simulation of the respective subsystem whenever a specified condition on a specified input or output signal of the respective subsystem is satisfied. The watchdog mechanism allows a child simulation object to be synchronized with important signal transitions in the parent simulation object, and vice versa.

17 Claims, 7 Drawing Sheets

Hierarchical Model Structure

Star Structure With Backplane

FIG. 1

Peer-to-Peer Structure

FIG. 2

Flat Cosimulation Structure

FIG. 3

Interdisciplinary System Model

FIG. 4

Hierarchical Cosimulation Structure

FIG. 5

Hierarchical Model Structure

SYSTEM AND METHOD FOR COSIMULATION OF HETEROGENEOUS SYSTEMS

The present invention relates generally to computer systems for simulating the operation of electronic circuits, software, mechanical systems, hydraulics, pneumatics, electromechanical systems, and combinations thereof, particularly to a system and method for integrating the operation of simulation objects representing various portions of a heterogenous system.

BACKGROUND OF THE INVENTION

A cosimulation is defined to mean the coordinated simulation, using N simulators, of N sub-models that together form a comprehensive model of a corresponding comprehensive system, in a way that the cosimulation behaves as closely as possible to one hypothetical simulation of the comprehensive model by one hypothetical simulator capable of simulating the comprehensive system.

The development of complex systems is almost always an interdisciplinary task involving several development teams that work on various components of the system in parallel. An example is the development of the electronically controlled transmission in a car: while one team might be concerned with increased fuel economy by improving the software implementing complex, potentially adaptive control algorithms, another team might investigate the ramifications of replacing an electronic sensor by a cheaper product, and a third might be working on the mechanical or hydraulic components of the transmission.

Any detailed simulation of the transmission's operation logic needs to include not only models of the mechanical and hydraulic components, but also electromechanical models of the sensors and actuators, and a model of the electronic control unit that implements the control logic. These different components will likely have been developed in different groups using different software tools, for example:

- a tool for modeling and simulating abstract dynamic systems and designing embedded control software (such as MATRIXx, a product of Integrated Systems, Inc.),
- a tool for modeling and simulating the mechanical aspects of the transmission,
- a tool for modeling and simulating the electronic circuitry in the transmission, and
- a tool for modeling and simulating the hydraulic components of the transmission.

Two fundamental approaches are possible when attempting to simulate such a heterogeneous system: either, one simulator is used that is able to simulate the entire comprehensive system, or a number of simulators is used in a coordinated manner so that the collective simulation results reflect the behavior of the transmission as a whole. The latter approach is called cosimulation.

Neither standard data formats that could represent a system as heterogeneous as the one in this example nor simulation tools that could simulate it exist today. Such simulation tools are not expected to exist in the foreseeable future. Thus a system simulation of a heterogeneous system requires a cosimulation of N simulators with different capabilities. Preferably the cosimulation will be between the simulators of all the tools that have been used when developing the components.

In order to allow this cosimulation of N simulators from different vendors, simulating models using different modeling paradigms (e.g., electronics, software, mechanics, etc.) and with various simulation methods (e.g., event-queue-based, differential equation based, etc.) without significant restrictions, a sophisticated cosimulation architecture is necessary.

Several cosimulation approaches have been proposed and implemented, partially as commercial products, in the past. See L. Maliniak, "Backplanes Mesh Simulators into One Environment," Electronic Design (Aug. 8, 1994); and S. Schmerler et al., "A Backplane for Mixed-Mode Cosimulation," in Proc. Eurosim 1995, Vienna, Austria. They range from ad-hoc integrations of two simulators, to complex simulation backplanes. Depending on the specific approach or product, various problems have effectively prevented their wide-spread adoption. In particular, it has been difficult to extend the prior art cosimulation techniques to cosimulations having multiple simulators using different simulation techniques (such as multiple differential equation solvers) and to incorporate extensions such as new data types.

The present invention avoids problems associated with prior cosimulation techniques. In particular it:

Uses a standardized protocol for exchanging signals between simulation objects, rather than a proprietary one. This makes it easier to ntegrate simulation products from different companies.

Can handle a virtually unlimited number of simulators operating together.

Does not require the use of a fixed set of synchronization techniques to synchronize the operations of the cosimulating simulators. In fact, multiple synchronization methods can be used concurrently in different parts of the cosimulation.

Can be used on one CPU, or across networks on different platforms.

Allows parallel execution of simulations.

Is not limited with respect to the simulation methods that participating simulators may use. Thus the cosimulation is not limited to discrete-event simulations only. Also there is no limit on the number of differential equation solvers used.

The numerical precision of the cosimulation degrades gracefully if some of the participating simulators do not support the full cosimulation protocol, in particular rollback capabilities. This allows virtually any simulator to participate in a cosimulation, albeit with less than ideal precision in some circumstances, in spite of not having rollback capabilities.

Cosimulation, according to the definition given above, should be part of a comprehensive development process whose goal is to create one comprehensive system, rather than different, non-integrated models for various components. The comprehensive model may be arbitrarily heterogeneous. In particular, its sub-models may use a wide variety of modeling languages and techniques, and may use a wide variety of simulation techniques.

Figure 1:
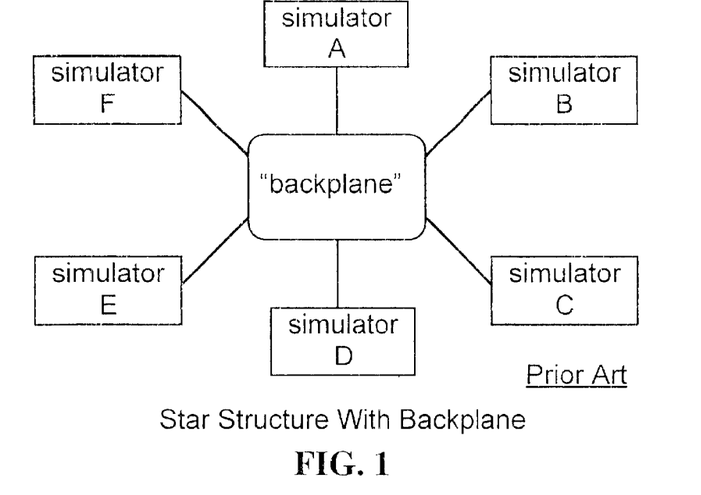
FIG. 1 is a block diagram of a prior art cosimulation system using a common backplane to exchange signal values between cooperating simulators.
Figure 2:
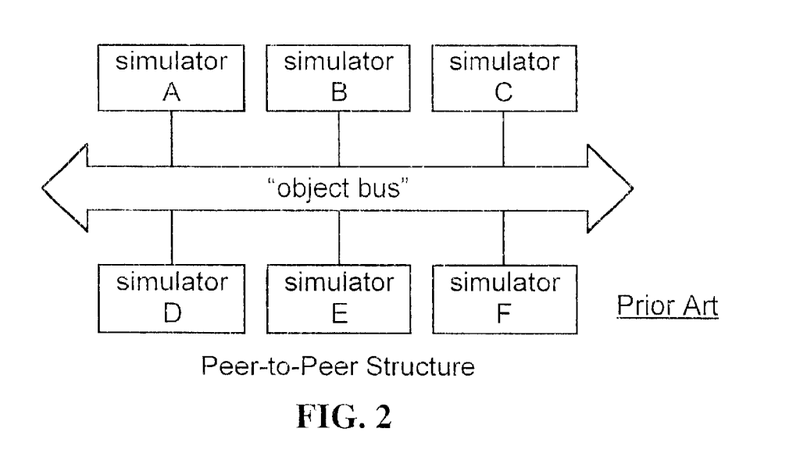
FIG. 2 is a block diagram of a prior art cosimulation system using an object bus to exchange signal values between cooperating simulators.

Most previous cosimulation approaches have advocated a bus-line or star-like structure for cosimulation. An example of the star structure, also known as the backplane structure, is shown in FIG. 1. In the backplane type of cosimulation system, the backplane controls the simulation time steps used by all simulators, and essentially tells all the simulators when to perform each incremental simulation step (i.e., when all the simulators are ready to perform that next step). In backplane based cosimulation systems, there are no parent/child relationships between simulators; all simulators are equal "siblings" that simply share signal values with each other. All the simulators run independently of each other, synchronized by signals generated by the backplane. There are several problems with the backplane cosimulation structure. For instance, like most centralized systems, it does not scale up well. When the number of simulators increases, the number of interactions between simulators increases, and the backplane becomes a bottleneck. The bottleneck problem can be solved by using a peer-to-peer setup, using a virtual object bus, as shown in FIG. 2. However, this cosimulation structure is, in general, entirely unrelated to the structure of the comprehensive model. It also violates the abstract design principles of encapsulation and locality. Thus, like the backplane based cosimulation structure, the peer-to-peer structure also treats all simulators as equal, parallel partners in the simulation, all running independently except for periodic data exchanges.

Figure 3:
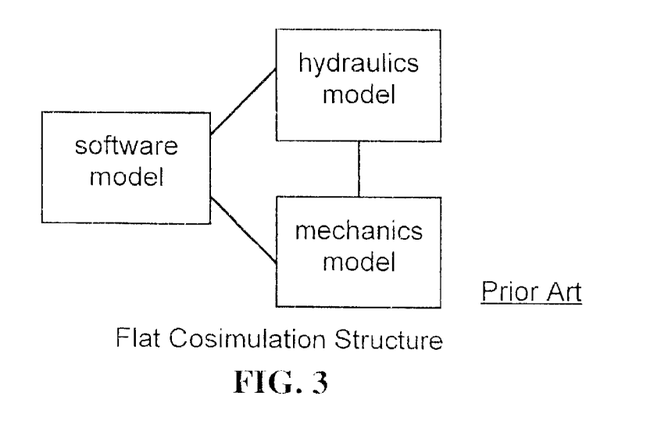
FIG. 3 is a block diagram of a prior art cosimulation system using a flat cosimulation structure.

Many traditional approaches to cosimulation, including the backplane and peer-to-peer structures mentioned above, assume that the comprehensive model has a flat structure, such as the one shown in FIG. 3. In a flat structure, all simulators are equal partners in the cosimulation. No simulator can invoke another simulator in order to generate its results. For this reason, each component of the system must be modeled using only one tool, and the system being simulated must be partitioned in terms of simulation tools, rather than in terms of functions. Also, in violation of real time system analysis principles, a flat cosimulation structure must support point-to-point communication from virtually all outputs of a simulator to all inputs of all other simulators.

While the flat structure might be appropriate for small models, it is inappropriate for larger models. Larger models will almost always be hierarchical, and will often be heterogeneous in any branch of the hierarchy. In other words, individual branches of the hierarchy will often require simulations by two or more distinct types of simulators. Also, larger models may contain multiple sub-models creating using the same tool, but in different places in the system hierarchy.

SUMMARY OF THE INVENTION

The present invention is a cosimulation system formed from a hierarchy of simulation objects. Each simulation object, other than the root object, is coupled to a respective parent simulation object by a respective, individual parent-child binding that is distinct and separate from every other parent-child binding. As a result, synchronization of simulation objects is handled on an individual parent-child basis, rather than a global basis.

Each of the simulation objects has an interface for communicating with each of its children simulation objects as well as its parent simulation object (if any). The simulation object communication interfaces all use the same, predefined protocol, and send messages to each other via a common protocol communications medium.

Each simulation object includes a simulation module for performing an incremental simulation of a respective subsystem in accordance with a set of associated input signal values. Each parent-child binding defines a source in the respective parent simulation object for each input signal associated with the respective child simulation object, and also specifies a destination in the parent simulation object for each output signal generated by the child simulation object. A predefined set of return data (including the child output signal values) is sent by the child simulation to its parent whenever simulation of the child subsystem is stopped or completed.

Some of the simulation objects include a respective watchdog module for stopping simulation of the respective subsystem whenever a specified condition on a specified input or output signal is satisfied. When one or more watchdog conditions are set on the outputs of a child simulation object, execution of the simulation by the child simulation object is stopped at the earlier of (A) the simulation end time specified by the parent simulation object, and (B) when the respective watchdog condition on any respective output signal of the child simulation object is satisfied. The data returned by the child simulation object includes the actual simulation time at which the execution of the simulation in the child simulation object stopped.

Further, a child simulation object may request from its parent simulation object one or more watchdog conditions to be set on its input signals, which are generated by the parent simulation object. When executing a simulation in the parent simulation object, and the respective watchdog condition on any input signal of the child simulation object is satisfied, execution of the parent simulation is stopped. The time at which the parent simulation is stopped by satisfaction of a watchdog condition is called a breakpoint simulation time. The parent simulation object sends a simulation request to the child simulation object that specified the satisfied watchdog, with the simulation end time being set to the breakpoint simulation time. The watchdog mechanism allows a child simulation object to be synchronized with important signal value changes in the parent simulation object, and vice versa.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The terms "simulator" and "simulation object" are both defined to mean one instance of a software tool or module that is used to simulate a system or a portion of a system. In some cases a simulator is implemented as a computer system that executes a simulation tool so as to simulate the operation of a device portion represented by a model. However, in other cases a simulator is just one instance of a simulation tool; thus a single computer might execute several instances of the simulator, especially if the computational resources of the computer are sufficient to handle the computational load associated with executing multiple instances of the simulator. Thus, the core of a simulator or simulation object is a software simulation module that is used to simulate an instance of a model of a certain type (e.g., mechanical, or electronic) of subsystem.

Figure 4:
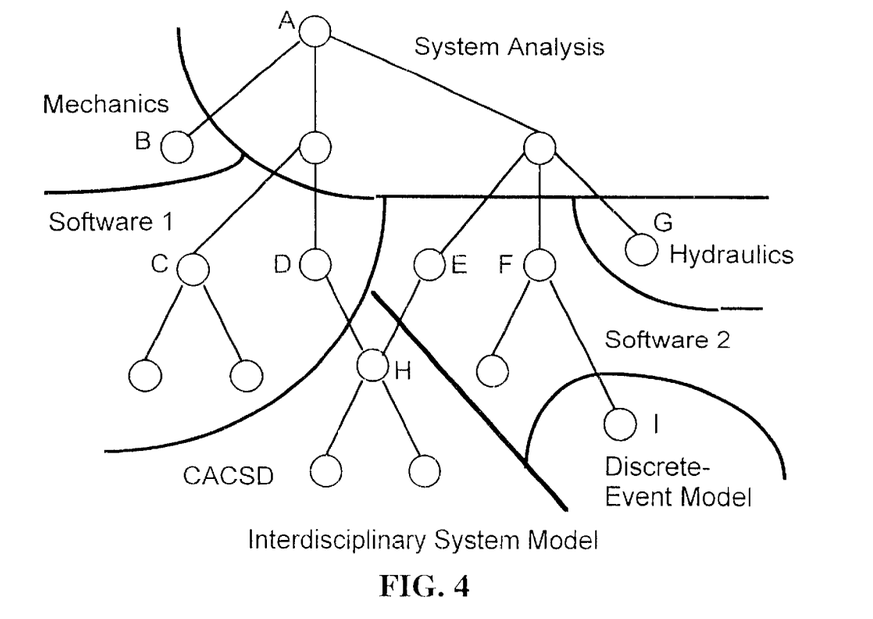
FIG. 4 schematically depicts a comprehensive and interdisciplinary model of a system.

FIG. 4 shows the structure of a large, comprehensive and interdisciplinary model that has been developed without artificial constraints by the lack of tool interoperability. This structure reflects a typical development approach used for many large, interdisciplinary systems today: starting with a high-level, abstract system representation using a systems-analysis technique (such as structured or objected-oriented analysis), the components are refined step by step using modeling techniques that are most appropriate for them. In the example shown in FIG. 4, the abstract system model has been decomposed into a mechanical component, a hydraulic component, and two software components. The software components in turn are refined into a model described using a discrete-event technique, and a CACSD (computer aided control system design) type model. Certain sub-models could be reused in several branches of the comprehensive model hierarchy, in this case the CACSD submodel is used twice.

Figure 5:
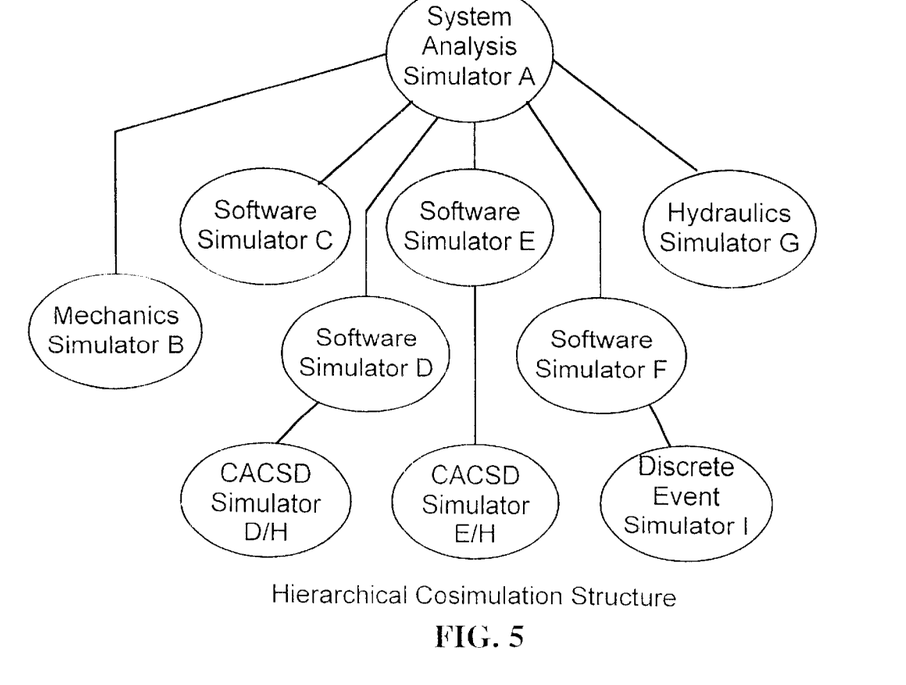
FIG. 5 depicts the relationship between a set of simulators for simulating the system whose model is shown in FIG. 4.

A cosimulation structure that obeys the principles of encapsulation and locality needs to have the same topology as the model of the comprehensive system whose operation is being simulated. FIG. 5 shows a cosimulation structure for a comprehensive system modeled by the components shown in FIG. 4. Simulator A is the root simulator that drives the cosimulation. Note that all the sub-models that are referenced from a different tool, and that are not connected to other submodels in the same tool, do not know about each other. That is, each such sub-model operates independently of the others. For instance, from the viewpoint of the tools used for "Software 1", simulators C and D are entirely unrelated. Therefore, at least conceptually, an independent simulation is required for each of those sub-models. Also, the sub-models that are referenced multiple times in a comprehensive model must be handled as independent instances of the same subsystem at simulation time. The CACSD submodel in FIG. 5 is an example of this. In the simulation structure it is simulated twice, because it is referenced both from D and E in FIG. 4.

It is a premise of the present invention that a cosimulation structure that is topologically the same as the model structure has significant benefits over a "flat" cosimulation structure. A "flat" cosimulation structure would either restrict the allowed structure for the comprehensive model, requiring all the simulators to operate in parallel as equal partners in the cosimulation, which is contrary to virtually all system development methodologies, or it would require sophisticated "transformation" functionality that transforms a hierarchical model into a flat model for simulation purposes. The latter is not only counter-intuitive for the user, it might also have significant influences on the simulation behavior due to the changed hierarchy.

In addition, some systems engineering methodologies, most notably SA/RT (i.e., Structured Analysis with Real Time extensions) allow one to model systems that may enable and disable certain subsystems based on certain conditions. For example, if in the example in FIG. 4 the systems analysis component is modeled using SA/RT, it might be programmed to disable certain sub-models, for example a software sub-model, based on certain conditions. If the simulator hierarchy is the same as the model hierarchy, disabling a sub-model means simply putting the corresponding simulator (or simulator subtree) into sleep mode until the subsystem is activated again. This means that the parent simulator does not issue commands to instruct the child simulator to advance the child simulation during the time in which the corresponding subsystem is inactive.

In a flat cosimulation structure, this is difficult to achieve because a flat cosimulation system cannot dynamically reconfigure itself in the middle of a simulation. Virtually no cosimulation approach that uses a flat cosimulation structure supports this kind of enabling/disabling behavior over an arbitrary number of levels in the comprehensive model's hierarchy. Note that the hierarchical cosimulation structure of the present invention also allows the application of SA/RT semantics on sub-models that are modeled using a language that does not know activation/deactivation semantics such as control block diagrams. Using the present invention, activation/deactivation can be modeled and simulated easily without the CACSD simulator knowing about the activation/deactivation semantics.

Figure 6:
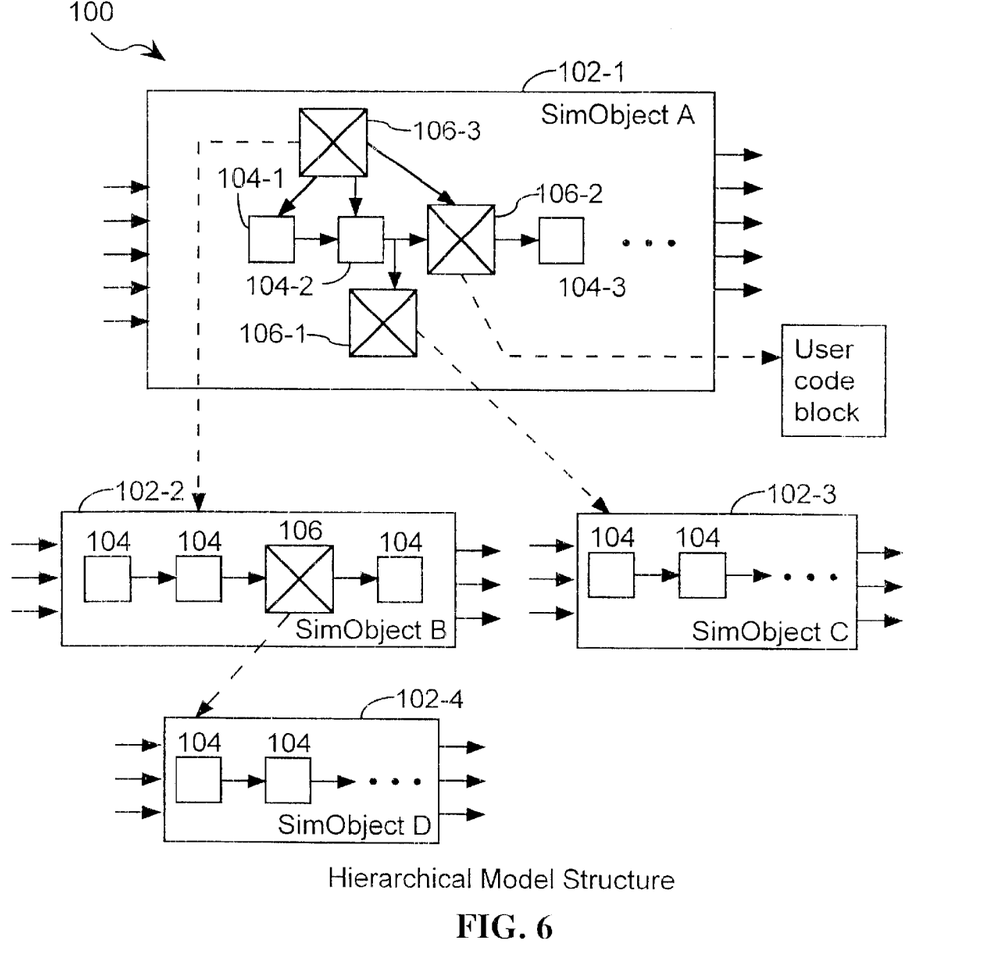
FIG. 6 shows an example of a hierarchical model structure representing a comprehensive system from the viewpoint of the functional blocks defined in a set of simulators.

FIG. 6 shows an example of a hierarchical model structure 100 representing a comprehensive system from the viewpoint of the functional blocks defined in a set of simulators 102. In this simplified diagram, each simulator model has two types of functional blocks: "native" blocks 104 that represent computations performed by the simulator to simulate the operation of a subsystem, and "foreign" blocks 106, that represent references to sub-models outside the simulator. These references to sub-models may be implemented as procedure calls (such as to another simulator, or to a user code block) at simulation time. Also, it is should be understood that not all simulators use "foreign blocks." Rather, there are a variety of ways in which simulators allow a subsystem model to include references to external sources of signal values; the foreign block mechanism is just one such mechanism.

Each simulator model, defined in the context of a particular simulation object, has a defined set of input and output signals. Each foreign block 106 (or other external sub-model reference mechanism) also has a defined set of input and output signals. Each foreign block 106 typically corresponds either to a user-defined "code block" (i.e., a function or procedure) or to another simulation object, which performs computations so as to generate the signals required by the simulation object in which the foreign block is located. For instance, lets say that the simulation object 102-1 (also labeled SimObject A) is generating values for some or all of its internal signals at a time that is, say, 10 milliseconds later than the last time for which those signal values have been generated. In order to generate some of the internal signals, the user code block corresponding to foreign block 106-2, and the simulation objects 102-2, 102-3 corresponding to foreign blocks 106-1 and 106-3 are called so as to update their computations accordingly. When the simulation objects 102-2 and 102-3 are called, they may, in turn, call other simulation objects (e.g., simulation object 102-4) in order to perform the computations requested by the first simulation object 102-1. Eventually, the signal values requested by the first simulation object 102-1 are generated by the lower level simulation objects and passed back to the first simulation object 102-1.

It should be noted that, although it is not shown in FIG. 6, each input and output of a sub-model (represented by a foreign block) must be connected to corresponding signal nodes in the parent model.

Figure 7:
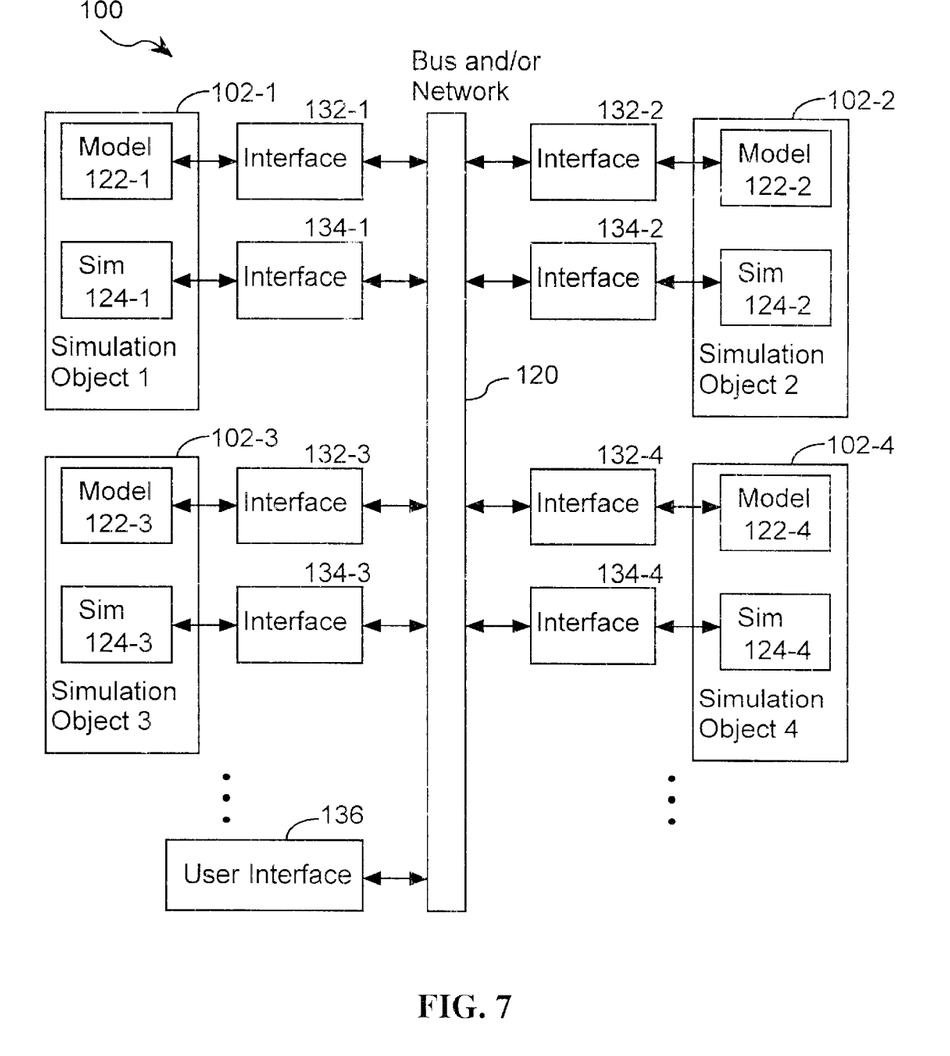
FIG. 7 shows a set of simulation objects interconnected by a bus or network for purposes of exchanging signal values and messages.

Referring to FIG. 7, while the present invention forms a logical structure in which the simulation objects are interconnected in a hierarchical manner, physically the simulation objects are interconnected by a bus and/or network (or combination of multiple busses and/or networks) 120 for purposes of exchanging signal values and messages. Each simulation object is assumed to include a modeling component 122 and a simulation component 124, and this is accurate for a great many simulation programs. Even when this is not literally true for a particular simulation object, it can treated as though it were for purposes of utilizing the present invention.

Two interfaces 132, 134 are provided for each simulation object: a model interface 132 for communicating information about the subsystem model in the simulation object to a user interface module 136, and a simulation interface 134 for handling outgoing and incoming messages during execution of a cosimulation. The purpose of the two interfaces is to allow communication with the simulation objects using a standard protocol. In the preferred embodiment, all communications with simulation object are handled using CORBA (common object request broker architecture), an open, vendor-neutral standard defined by the Object Management Group. It should be understood that the present invention can be implemented using a bus or network communication protocol other than CORBA. Preferably, the interfaces 132, 134 operate as a kind of "wrapper" around each simulation object, making each simulation object compatible with whatever communication protocol is being used to handle data and message flows between the simulation objects participating in a cosimulation.

CORBA is an object-oriented technology that allows objets of any kind to communicate across networks. CORBA-enabled programs can be written without paying attention to whether other objects are local, or what platform they are on. CORBA features a programming model that allows any software entity to interact with objects on an object/message level without having to go down a network or protocol layer.

CORBA takes care of parameter marshaling and the like for transferring messages and method calls from one object to another. A large number of different language bindings (e.g., C, C++, Java), exist to CORBA, making it practically both language and platform independent. One of the benefits of using CORBA for the communication protocol is that the participating simulation objects can be implemented in many different ways, in particular on different platforms, networks, and in almost any programming language.

Simulation Object Interface

Referring to FIGS. 6 and 7, whenever a parent simulation object such as 102-1 (FIG. 6) needs to update the signals generated by a foreign block, it makes a procedure call that-is converted by its simulation interface 134 into a CORBA-compliant method call to the appropriate child simulation object (or user code block in the case of a foreign block implemented by a user code block). The method call is synchronous, meaning that the thread in the parent simulation object making the call is suspended until the called simulation object performs the requested simulation computation and returns the requested signal values, at which point the calling thread in the parent simulation object resumes execution. If the calling simulation object is multi-threaded, threads other than the calling thread may continue working while the calling thread waits.

The language-independent protocol between a CORBA client and a CORBA server is specified using an interface definition language (IDL). All simulators (i.e., simulation objects) that participate in a cosimulation using the preferred embodiment of the present invention talk to each other using the same protocol.

A simulation object (sometimes herein called a SimObject) encapsulates the execution of a sub-model by a simulator, and presents a uniform interface of that execution to the simulation object's client. The client of a simulation object is usually called the parent of the simulation object, and the simulation object is often called the child simulation object. In some cases, a simulation object is equivalent to a simulator instance, but the protocol uses a more abstract concept of a simulation object in order to allow for simulators that can perform more than one simulation at the same time.

In the preferred embodiment, the interface definition for a simulation object is as follows:

```
interface SimObject {
                 canGoBackInTime;             /* boolean value, indicates whether this
                                                 simulator can rollback to a previously
                                                 saved checkpoint */
                 InitResults init( );         /* initialization method */
                 end( );                      /* termination method */
                 RunResults run(in RunData);  /* main procedure call for performing
                                                 an incremental simulation*/
};
RunData {
                 startTime;
                 endTime;
                 assertedMinimumRollbackTime;
                 list of input signal values;
                 list of watchdogs to set on outputs of simulation object;
                 };
RunResults {
                 currentTime;                 /* actual simulation stop time */
                 wantedStartTime;             /* requested simulation start time */
                 wantedEndTime;               /* requested simulation end time */
                 minimumWantedRollbackTime;   /* requested min rollback time */
```

-continued

```
            list of output signal values;        /* Output signals requested by parent
                                                    simulator. During execution only those
                                                    output signals whose values changed
                                                    during the simulation period are
                                                    transmitted to the parent */
            list of watchdogs to set on inputs of simulation object;
        };
InitResults {
            wantedEndTime;                       /*requested simulation initialization
                                                    time */
            list of watchdogs to set on inputs of simulation object;
        }
```

The members of the SimObject interface are defined as follows:

canGoBackinTime is a boolean value that is readable by the parent simulation object and that indicates whether or not the simulation object is of the type that can be backed up to an earlier time. In other words, if a simulation run by the simulation object can be backed up to an earlier saved state (sometimes called a checkpoint) so that a portion of the simulation can be re-run using new input values, canGoBackInTime is equal to True; otherwise it is equal to False.

init( ) is a method that is called to initialize the simulation object before a simulation is executed, and returns an initial set of requested input signal watchdogs.

end( ) is a method that is called after a simulation has been completed or aborts, and is used to terminate a simulation.

run is the method that runs an incremental simulation of a model from a specified starting time (startTime) and continuing until a specified ending time (endTime), unless earlier terminated by a watchdog or error condition.

RunData is a data structure specifying an incremental simulation to be executed.

RunResults is a data structure for returning results produced by the incremental simulation.

The members of the RunData data structure include:

startTime, which specifies the simulation time at which a requested incremental simulation is to begin. This is usually set equal to the endTime of the last incremental simulation performed by the simulation object. To indicate that the simulation object should perform a rollback, the startTime is specified by the parent as being earlier than the endTime of the last incremental simulation performed by the simulation object.

endTime, which specifies the simulation time at which the incremental simulation should end.

assertedMinimumRollbackTime indicates the earliest time that the parent could ask the simulation object to roll back to. The called simulation object can release all but the last of any checkpoints it has saved for simulation times at or before the asserted minimum rollback time.

"list of input signal values" specifies input signal values and is structured as a list of (signal name, value) pairs. For reasons of efficiency, the list of input signal values only contains information about those inputs whose value has changed since the last invocation of the simulation object. For the first invocation, all input signals must be assigned a value.

"list of watchdogs to set on outputs of simulation object" specifies the watchdogs to be set on specified outputs of the simulation object, and is structured as a list of (port name, watchdog type, watchdog parameter) tuples. To turn off a previously set watchdog, a type with a watchdog type of "no_watchdog" is sent to the simulation object.

The member of the RunResults data structure include:

currentTime, which indicates the actual simulation time at which the incremental simulation stopped, which may differ from the specified endTime, if the simulation is stopped by the triggering of a watchdog or by an error condition. For instance, the simulation object may stop at an earlier time than the one requested if a watchdog in the simulation object is triggered, indicating that a watchdog condition has been satisfied.

wantedStartTime is the simulation start time requested by child simulation object for a next incremental simulation interval.

wantedEndTime is the simulation end time requested by the child simulation object for a next incremental simulation interval.

minimumWantedRollbackTime indicates the earliest rollback time to which the child simulation object can roll back.

"list of output signal values" indicates the changed output signals, produced by the child simulation object, and is structured as a list of (signal name, value) pairs.

"list of watchdogs to set on inputs of simulation object" indicates watchdogs the simulation object wants to have set on the simulation object's input signals, which are signals generated in the parent simulation object. The returned list is structured as a list of (port name, watchdog type, watchdog parameter) tuples.

By using "incremental data exchange," in which only changed signal values and changed watchdogs are transmitted, the volume of transmissions between simulation objects is reduced.

The members of the InitResults data structure are a subset of those in the RunResults data structure, and represent the simulation initialization time and the simulation object's initial request for watchdogs on its input signals.

All the relevant SimObject parameters for requesting an incremental simulation by a simulation object are packaged together and transmitted to the simulation object as a RunData data structure. When the incremental simulation completes, it returns a RunResults data structure, as defined above.

Referring to FIG. 5, the client of a simulation object is usually the simulator that is simulating the part of the comprehensive model that is the logical parent of the model simulated by the simulation object. For the highest level (root) simulation object, the client is the user process that issues a command to start the comprehensive simulation.

A parent simulator will typically determine whether or not a child simulation object can perform rollbacks, by retrieving the canGoBackinTime parameter at the same time that the parent initializes the child by calling the init( ) method. The parent may choose to apply a different synchronization protocol depending on whether or its child simulation object can rollback or not.

Cosimulation with more than one differential equation solver participating normally requires that all involved simulators support rollbacks. Using the present invention, those simulators that do not support rollbacks can still participate in a cosimulation, but it is the parent simulator's responsibility to instruct them in a way that minimizes overall simulation error (e.g., by using shorter simulation time increments than it would otherwise use).

Usually, the parent simulator will instruct the child simulation object to set its inputs for the next period of time and then advance for that time. The child simulation object will then run until the specified time unless a condition occurs that makes it stop earlier than that time. There are two kinds of conditions that can interrupt the execution of a simulation object prior to the desired end time:

An exception (i.e., error) condition occurs in the simulation object (such as a numeric overflow). This usually means that the simulation needs to be aborted, but this is at the discretion of the parent simulator. For instance, the parent simulation object might be able to instruct the child simulation object to perform a resimulation (if the child simulation object is capable of performing a rollback) using different parameters, allowing the comprehensive simulation to continue.

A watchdog on one of the inputs or outputs of the simulated subsystem is triggered.

Watchdog Synchronization Mechanism

One of the key problems in cosimulations is synchronization of each simulation object with important signal value changes generated by other simulation objects. Some of the traditional techniques for handling this are as follows:

1) If all or most of the simulation objects have the ability to roll back (i.e., to restart their simulation at an earlier time than the end time of the last incremental simulation performed by the simulation object), when certain signals change in value, the rollback mechanism (sometimes called a backup mechanism) is used to roll back (or back up) the affected simulation objects to the point in time at which the transition occurred. Of course, this is accurate only to the, extent that the signal transition time can be determined. Since the simulator that generates the changing signal value will generally produce output signals only at a specified simulation end time for this incremental simulation step, the signal transition time may be impossible to determine with any precision. As a result, the operation of the simulators is not accurately synchronized and the precision of the cosimulation will be unsatisfactory.

2) Small simulation time increments can be used so as to more accurately capture key signal transitions (i.e., signal value changes). By using shorter duration incremental simulations than would be required for accurate simulation of a sub-model while its input signals are static, better synchronization with input signal transitions (i.e., value changes) can be achieved. This second technique may greatly increase the amount of computer resources required to perform a cosimulation and might have adverse numeric consequences.

3) A combination of rollbacks and dynamically determined simulation time increments can be employed to improve synchronization with a sub-model's input signal transitions.

The present invention provides a new "watchdog" mechanism for more precisely synchronizing the operation of simulation objects participating in a cosimulation. The watchdog mechanism largely eliminates the need for small simulation time increments, and often avoids the need for simulation rollbacks to saved checkpoints.

In accordance with the present invention, any simulation object can be instructed by its parent simulation object to attach a "watchdog" 140 (FIG. 8) to one or more of its outputs. The purpose of this watchdog is to interrupt the execution of the simulation object when its firing condition becomes true. A number of different watchdog firing conditions can be used. Most watchdogs are attached to a single output signal, but some can be attached to multiple output signals. The most common firing conditions are:

fire when the value of the output signal to which the watchdog is attached changes;

fire when the value of the output-signal to which the watchdog is attached changes by more than a specified value:

fire when the value of the output signal to which the watchdog is attached becomes larger than a specified threshold value;

fire when the value of the output signal to which the watchdog is attached becomes smaller than a specified threshold value; and fire when the value of a first output signal exceeds the value of a second output signal.

The parent simulation object includes the following tuple in the RunData data structure to attach a watchdog to an output of a child simulation object:

(output port name, watchdogType, value)

where the "watchdogType" indicates the firing condition, and "value" is a parameter of the firing condition, such as a threshold value or minimum increment value.

The RunData data structure can include as many or as few watchdog request tuples as may be required to set up watchdogs in the child simulation object.

During a simulation, a parent simulation object may instruct a child simulation object to change watchdogs, depending on the state of the parent simulation object. For instance, the parent may need to precisely synchronize itself with zero-crossings of a particular signal when it is in one state, whereas that same signal may have no impact on the parent's sub-model when it is in a second state. Thus, the parent (or the parent's simulation interface) would be programmed to request an appropriate watchdog on the signal when it is in the first state, and to release the watchdog when it is in the second state.

Similarly, the child simulation object can include the following tuple in the RunResults data structure (which is returned to the parent simulation object upon completing each incremental simulation) to indicate a watchdog 142 that the child wants the parent to attach to an input of the parent simulation object:

(input port name, watchdogType, value).

The RunResults data structure can include as many or as few watchdog request tuples as may be required to set-up the watchdogs required by the child simulation object.

Figure 8:
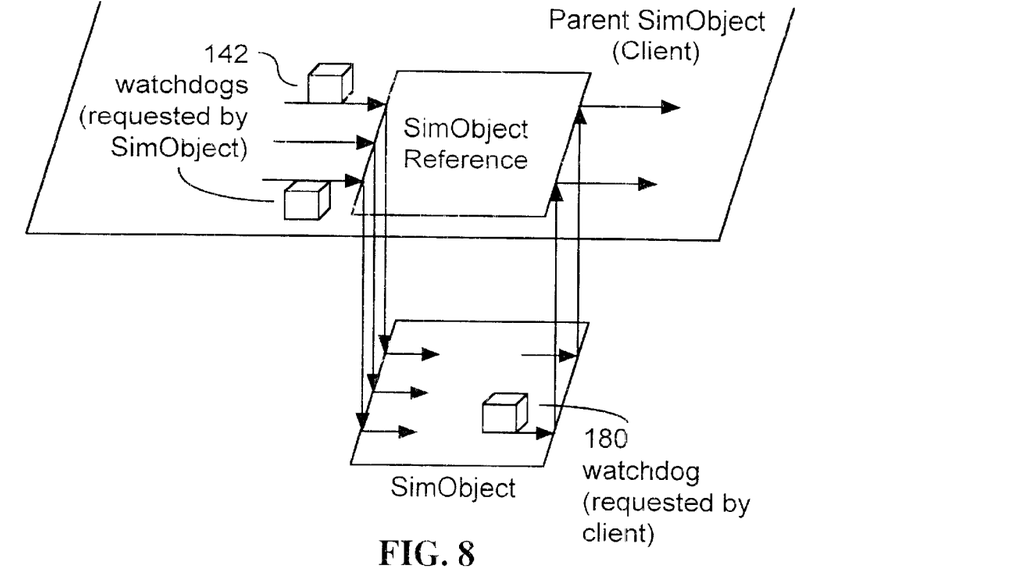
FIG. 8 shows where watchdogs may be attached at the boundary between a parent simulation object and a child simulation object.

Of course, it is up to the parent-simulation object to actually implement the input signal watchdogs requested by the child simulation object, and it is up to the child simulation object to actually implement the output signal watchdogs requested by the parent simulation object. Many simulation tools include the ability to stop a simulation whenever a specified signal transition occurs, in which case the simulation interface 134 for the simulation object simply executes the commands required to implement the watchdogs requested by another simulation object. However, some simulation tools that include the ability to stop a simulation whenever a specified signal transition occurs, require all such stop conditions to be specified before the simulation is started; that is, they do not allow the stop conditions to be specified dynamically during a simulation. Other simulation tools do not include the ability to stop a simulation whenever a specified signal transition occurs. A combination of small incremental simulation steps and rollback checkpoints can be used for synchronization when a child simulation object does not support the watchdog mechanism of the present invention.

The two watchdog mechanisms described above allow each simulation object to instruct another simulation object with which it is exchanging signals to stop whenever "something interesting" happens. FIG. 8 shows where at the boundary between client (i.e., parent) and simulation object (i.e., child) the watchdogs may be attached using the RunData and RunResults messages defined in the simulation object interface.

Once a child simulation object stops execution of an incremental simulation, either at the specified simulation end time or because a watchdog firing condition becomes true, the parent simulation object receives output signal values (the result data) from the child simulation object. From the returned data the parent can determine whether or not a watchdog firing condition became true, by comparing the actual simulation end time with the requested end time. If the two do not match (and an error condition in the child is not indicated), a breakpoint simulation time is set equal to the actual simulation end time of the child simulation object. Then some or all of the other blocks in the subsystem being simulated by the parent are simulated up to the breakpoint simulation time, depending on which of those blocks are affected by the output signals of the child simulation object. By simulating up to the breakpoint, and then continuing simulation from that point in time on, the parent simulation object synchronizes critical signal value changes produced by the child simulation object with the simulation being executed by the parent.

Similarly, when a watchdog on a child simulation object's input signal is triggered, the parent simulation is temporarily halted and a breakpoint is set by the parent. The parent then requests simulation of the child simulation object up to the breakpoint (i.e., using the breakpoint time as an end time for the incremental simulation), and later requests the child simulation object to perform an incremental simulation starting at the breakpoint time. In this way the child simulation object is able to receive input signals from the parent simulation object at exactly the point at which critical transitions occur in those signals. By simulating up to the breakpoint, and then continuing simulation from that point in time on, the child simulation object synchronizes critical signal value changes produced by the parent simulation object with the simulation being executed by the child.

Setting Up a Cosimulation Using Model Interfaces

Referring to FIG. 7, the model interface 132 for each simulation object 102 in a comprehensive model includes an interface definition for the simulation object, as well as an interface definition for every foreign block (i.e., reference to an external submodel) defined in the model 122 in simulation object 102. The interface definition for a simulation object preferably has the following form:

```
interface Executable Object {
    Name of simulation object;
    list of input ports;
    list of output ports;
    list of executable object references;
}
Executable Object Reference {
    name of object reference;
    list of input ports;
    list of output ports;
}
Input/Output Port {
    port name;
    data type;
}
```

Preferably, the executable object references are given names that match the names of the corresponding simulation objects, and the input and output ports in the executable object references match the names of the corresponding input and output ports of the corresponding simulation objects. When this is the case, matching executable object references with simulation objects can be largely automated.

Figure 9:
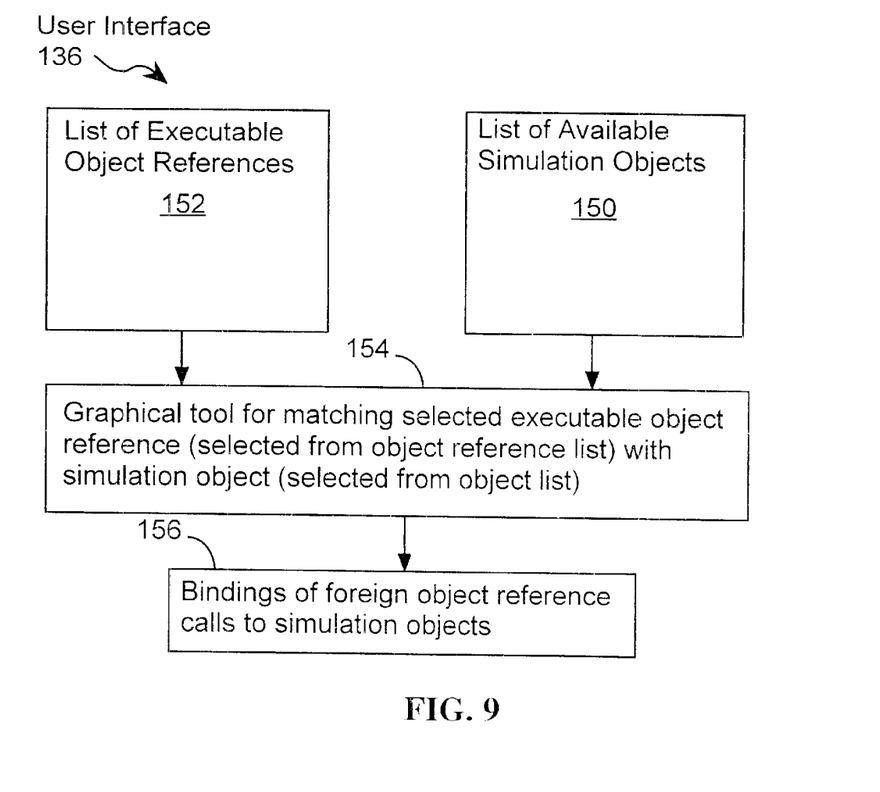
FIG. 9 depicts operation of a user interface for defining bindings between parent and child simulation objects.

Referring to FIG. 9, the user interface 136 receives the interface definitions for all the simulation objects to be included in a cosimulation. The provision of these interface definitions to the user interface is the primary function of the model interfaces 132 (FIG. 7) for the simulation objects. The primary purpose of the user interface, prior to the execution of cosimulations, is to define a set of parent-client bindings 156 that bind the foreign blocks in the simulation objects to specific simulation objects.

The user interface stores simulation object definitions in a first list 150 and executable object references in another list 152. It is the job of the user to "build" the heterogeneous model for the cosimulation. In particular, the user interface may provide a graphical tool 154 for matching a user selected executable object reference from list 152 with a simulation object in list 150. The tool is also used to match each of the input and output signal names for the executable object reference with corresponding input and output signal names of the matching simulation object. To the extent that the input and output signal names of the reference and simulation object are the same, the tool 154 can automatically provide the user with an initial guess as to the best set of input/output signal matches, which the user can then edit and/or accept.

Although external object references can be resolved into bindings 156 in any order, the user will preferably start with the root simulation object and work down to the lea, objects, matching simulation objects with the executable object references in each simulation object in the hierarchy. Once all executable object references in the root simulation object and all the lower level simulation objects have been resolved, a corresponding set of parent-child bindings 156 are generated to represent all the parent-child relationships in the model to be simulated. At simulation time, the parent-child bindings are used to determine the set of simulation object instances to be created for performing the cosimulation. The parent-child bindings are, in effect, loaded into the "parent side" of the corresponding simulation interfaces 134 (FIG. 7). The bindings are used to direct simulation method calls by each parent simulation object to the proper child simulation objects, and when necessary to map signal names in the parent simulation object into signal names in the child simulation objects that are called by the parent. (Signal name mapping is not required when the executable object references use the same signal names as the child objects.) The simulation interfaces 134 marshal the parameters for the method calls and the returned values into the format required by the interface definitions of the respective simulation objects.

Cosimulation Setup and Execution

Figure 10:
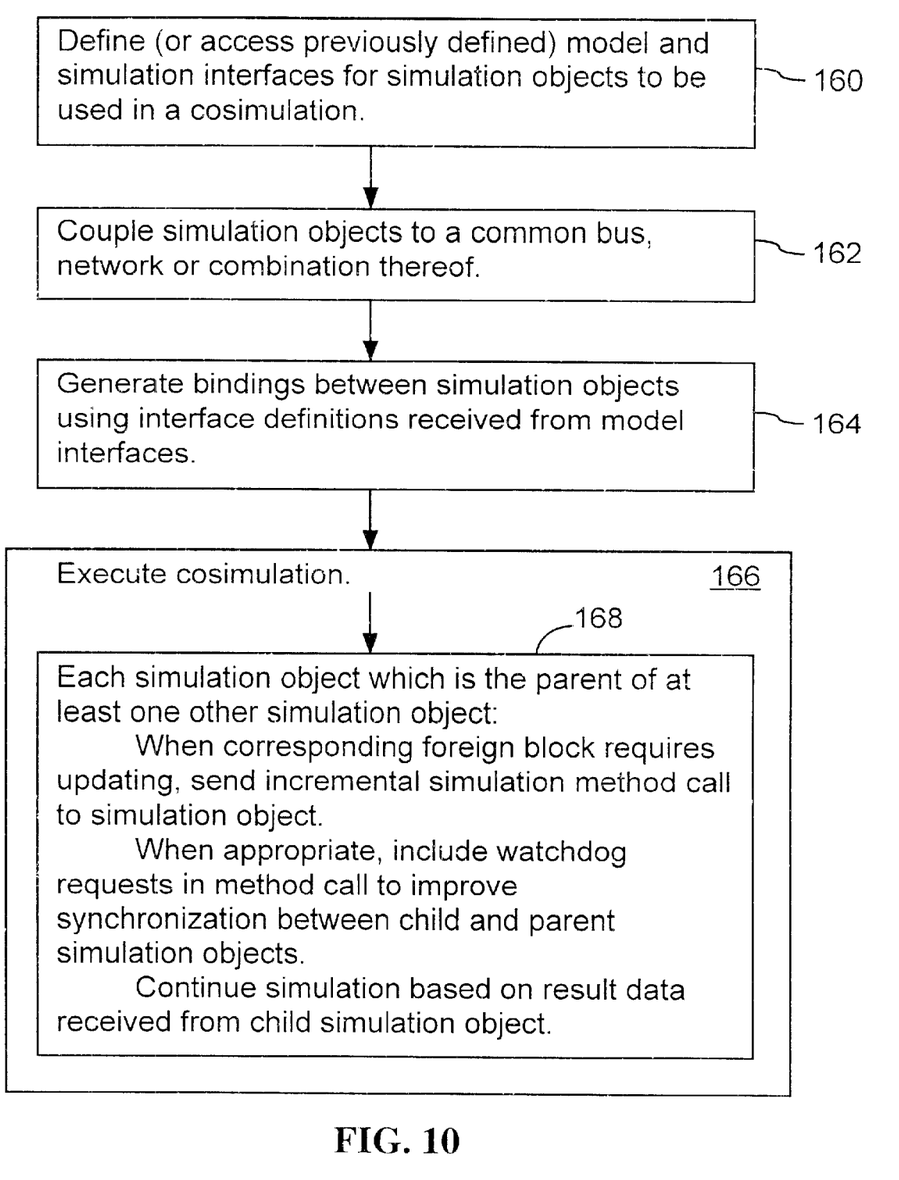
FIG. 10 is a flow chart of the cosimulation design and execution process in a preferred embodiment of the present invention.

Referring to FIG. 10, a cosimulation of a heterogeneous system, or any system, utilizing a multiplicity of simulation objects, begins by defining the model and simulation interfaces for the simulation objects (step 160). If the model interfaces have been previously defined, those interface definitions are accessed and sent to the user interface. Further, all the simulation objects needed for the cosimulation object are coupled to a common bus, network or combination of interconnected busses and networks (162). In the preferred embodiment the bus and/or network utilize the CORBA protocol for exchanging messages and data between calling and called objects.

Utilizing the user interface, the user generates bindings between the simulation objects, using the interface definitions received from the model interfaces (164). As previously described, this is accomplished by matching executable object references in the simulation objects with appropriate simulation objects, and matching the input and output signals of the executable object references with the corresponding input and output signals of the matching simulation objects. The bindings represent these matches, as well as the network location of the simulation objects that are the target of the method calls associated with each binding.

Once the bindings are generated and installed, the cosimulation is executed (166). During the cosimulation, each simulation object that is the parent of at least one other simulation object performs additional steps (168) for updating foreign blocks during the simulation. In particular, whenever a foreign block corresponding to a simulation object requires updating (e.g., because an updated signal value generated by the foreign block is required by another block in the model being simulated), an incremental simulation method call is sent to the simulation object corresponding to the foreign object. When appropriate, one or more watchdog requests are sent to the called simulation object to improve synchronization between the called (child) and calling (parent) simulation objects. After the called simulation objects completes execution and returns its result data, the calling simulation objects continues the simulation using the returned result data.

Simulation Object Implementation

Figure 11:
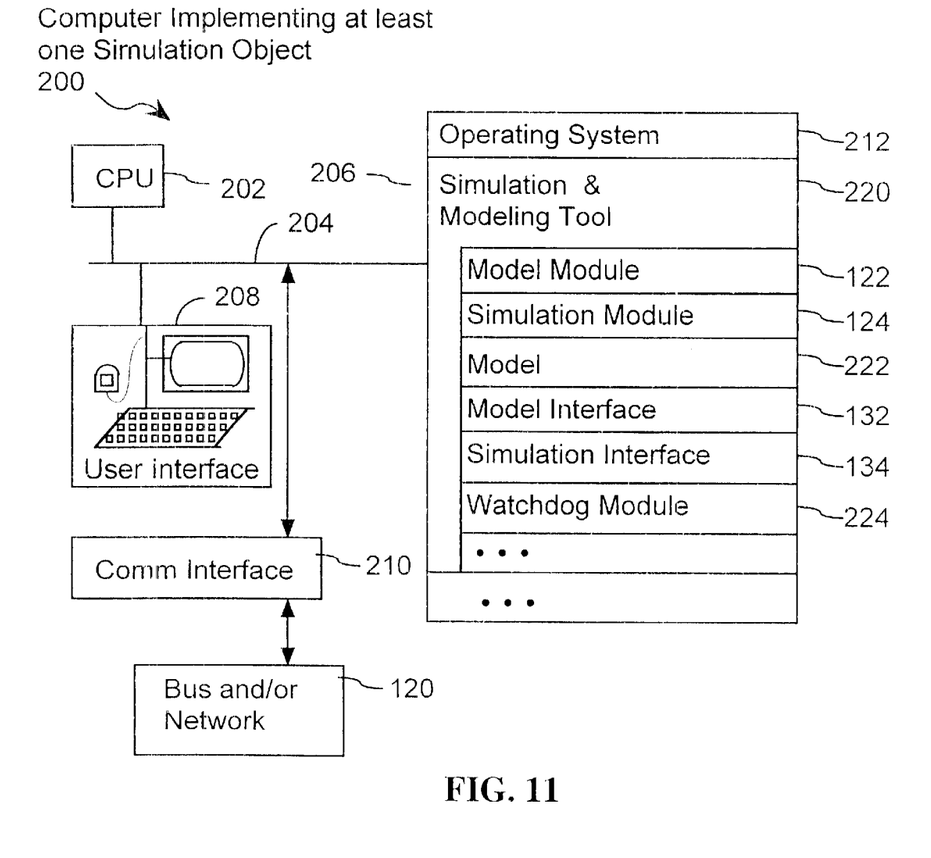
FIG. 11 is a block diagram of a computer implementation of a simulation object.

FIG. 11 shows a computer implementation of a simulation object. It should be understood that a single computer may execute more than one simulation tool, and that a single simulation tool may be run multiple times in order to executed multiple, distinct simulation objects. The computer 200 includes: a central processing unit (CPU) 202, one or more system busses 204 for transferring data and control signals between components, memory 206 (including high speed, volatile random access memory and slower, non-volatile memory such as disk storage) and a user interface 208. A communications interface 210, such as a network interface card, supports communications between simulation objects over a bus and/or network 120.

The operating system 212 and simulation and modeling tool 220 will vary from one implementation to the next; the particular operating system 212 and simulation and modeling tool 220 used are not critical to the present invention, since the present invention is designed to work with virtually any operating system 212 and virtually any simulation and modeling tool 220.

The memory 206 may store an operating system 212 and the simulation and modeling tool 220 in which the simulation object is implemented. The simulation and modeling tool 220 will typically include a modeling module 122, a simulation module 124, one or more model data structures 222 for representing the subsystem to be simulated by the simulation object, a model interface 132, a simulation interface 134, and a watchdog module 224 for implementing any watchdogs requested by the parent and/or children of this simulation object.

Alternate Embodiments

In an alternate embodiment, one or more external object references (sometimes called foreign blocks, above) can be treated as references to a real hardware system. At simulation time, the simulation objects would run in parallel with the hardware system, exchanging signal values with it. In this embodiment the simulation objects would need to be capable of real time execution, and rollbacks would probably have to be prohibited or highly restricted. In this way, a cosimulation of a control system could be tested out against a real hardware instance of the system being controlled.

The present invention can be implemented as a computer program product that includes a computer program mechanism embedded in a computer readable storage medium. For instance, the computer program product could contain the program modules shown in FIG. 11 as part of the simulation and modeling tool 220, or alternately the computer program product could contain just those modules that are not part of the simulation tool when it is used as a stand alone simulation product. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A cosimulation system, comprising:
   a hierarchy of simulation objects including a root simulation object and a plurality of other simulation objects, one or more of the simulation objects other than the root simulation object comprising a child simulation object with respect to a parent simulation object in the hierarchy of simulation objects, each simulation object other than the root object coupled to its respective parent simulation object by a respective individual parent-child binding that is distinct and separate from every other parent-child binding; wherein at least one of the simulation objects is a child object with respect to the root simulation object and is a parent simulation object with respect to another one of the simulation objects;

each of the simulation objects including an interface for communicating with each child and/or parent simulation object thereof using a single, predefined protocol utilized by the interfaces of all the simulation objects; and a common protocol communications medium for transmitting messages between the simulation objects in accordance with the single, predefined protocol;

wherein each simulation object is individually synchronized with its child simulation objects, if any, through use of the respective parent-child binding.

2. The cosimulation system of claim 1, wherein each of the simulation objects other than the root simulation object corresponds to a foreign block in a subsystem model whose operation is being modeled by the parent of the simulation object; and each simulation object other than the root simulation object performs incremental simulations in accordance with commands by the parent simulation object to update the output signals generated by the corresponding foreign block in the parent simulation object's subsystem model.

3. The cosimulation system of claim 1, wherein each simulation object includes a simulation module for performing an incremental simulation of a respective subsystem in accordance with a set of associated input signal values; each parent-child binding defining a source in the respective parent simulation object for each input signal associated with the respective child simulation object; and a subset of the simulation objects include a respective watchdog module for stopping simulation of the respective subsystem whenever a specified condition of a specified input or output signal of the respective subsystem, other than simulation time, is satisfied and for sending a predefined set of return data to the respective parent of the simulation object whenever simulation of the respective subsystem is stopped or completed.

4. The cosimulation system of claim 3, wherein a subset of the simulation objects accept a watchdog signal specification in conjunction with any incremental simulation, the watchdog signal specification for a respective simulation object indicating that simulation by the respective simulation object should stop when a respective specified condition of a specified signal, other than simulation time, is satisfied.

5. A method of performing a cosimulation, comprising:

establishing a set of parent-child bindings between simulation objects, the set of bindings corresponding to a hierarchy of the simulation objects, the simulation objects including a root simulation object and a plurality of other simulation objects, one or more of the simulation objects other than the root simulation object comprising a child simulation object with respect to a parent simulation object in the hierarchy of simulation objects, each simulation object other than the root object coupled to its respective parent simulation object by a respective individual one of the parent-child bindings that is distinct and separate from every other parent-child binding; wherein at least one of the simulation objects is a child object with respect to the root simulation object and is a parent simulation object with respect to another one of the simulation objects;

transmitting messages between the simulation objects in accordance with the single, predefined protocol, using the established parent-child bindings;

individually synchronizing each simulation object with its children simulation objects, if any, through the transmission of messages via the respective parent-child binding.

6. The method of claim 5, wherein each of the simulation objects other than the root simulation object corresponds to a foreign block in a subsystem model whose operation is being modeled by the parent of the simulation object; and each simulation object other than the root simulation object performs incremental simulations in accordance with commands by the parent simulation object to update the output signals generated by the corresponding foreign block in the parent simulation object's subsystem model.

7. The method of claim 5, wherein each simulation object includes a simulation module for performing an incremental simulation of a respective subsystem in accordance with a set of associated input signal values; each parent-child binding defining a source in the respective parent simulation object for each input signal associated with the respective child simulation object; and a subset of the simulation objects include a respective watchdog module for stopping simulation of the respective subsystem whenever a specified condition of a specified input or output signal of the respective subsystem, other than simulation time, is satisfied and for sending a predefined set of return data to the respective parent of the simulation object whenever simulation of the respective subsystem is stopped or completed.

8. The method of claim 7, wherein a subset of the simulation objects accept a watchdog signal specification in conjunction with any incremental simulation, the watchdog signal specification for a respective simulation object indicating that simulation by the respective simulation object should stop when a respective specified condition of a specified signal, other than simulation time, is satisfied.

9. A method of synchronizing execution of two simulation objects, comprising:

binding a parent simulation object to a child simulation object, the child simulation object having predefined sets of input signals and output signals;

specifying at least one respective watchdog condition on at least one respective output signal of the child simulation object, other than simulation time;

sending an incremental simulation request from the parent simulation object to the child simulation object, the incremental simulation request specifying a simulation start time and end time;

executing in the child simulation object the incremental simulation specified by the request until the earlier of (A) the specified simulation end time is reached, and (B) the respective watchdog condition on any respective output signal of the child simulation object, other than simulation time, is satisfied; and sending a predefined set of return data to the respective parent simulation object when execution of the simulation by the child simulation object stops.

10. The synchronization method of claim 9, wherein the incremental simulation request sending and executing are repeated a multiplicity of times; and the watchdog condition specifying is performed again, after at least one of the incremental simulations have been executed, so as to specify a different watchdog condition than a previously specified watchdog condition.

11. The synchronization method of claim 9, wherein the predefined set of return data includes values of the child simulation object's output signals and a simulation termination time, indicating a simulation time at which the execution of the simulation in the child simulation object stopped.

12. The synchronization method of claim 9, further including:
   specifying at least one respective watchdog condition on at least one respective input signal of a respective child simulation object, other than simulation time;
   executing an incremental simulation in the parent of the parent simulation object;
   stopping execution of the simulation in the parent simulation object when the respective watchdog condition on any respective input signal of the child simulation object, other than simulation time, is satisfied;
   determining an associated breakpoint simulation time when the execution of the simulation by the parent simulation object is stopped; and
   sending a simulation request from the parent simulation object to a child simulation object thereof, with the breakpoint simulation time as the simulation end time for the child simulation object.

13. A method of synchronizing execution of two simulation objects while performing a cosimulation that includes execution of incremental simulations by the two simulation objects, comprising:
   binding a parent simulation object to a child simulation object, the child simulation object having predefined sets of input signals and output signals;
   repeatedly, during performance of the cosimulation, performing:
      sending an incremental simulation request from the parent simulation object to the child simulation object, the incremental simulation request specifying a simulation start time and end time;
      executing in the child simulation object the incremental simulation specified by the request; and
      sending a predefined set of return data to the respective parent simulation object when execution of the simulation by the child simulation object stops;
   at a plurality of times during performance of the cosimulation,
      specifying a respective watchdog condition on at least one respective output signal of the child simulation object, other than simulation time; wherein at least one later specified watchdog condition is different from an earlier specified watchdog condition; and
   said executing including executing the incremental simulation specified by the request until the earlier of (A) the specified simulation end time is reached, and (B) the respective watchdog condition on any respective output signal of the child simulation object, other than simulation time, is satisfied.

14. A new computer program product for use in conjunction with a computer system, the computer program product comprising a computer readable storage medium and a computer program mechanism embedded therein, the computer program mechanism for a cosimulation system, the computer program mechanism comprising:

instructions that generate a hierarchy of simulation objects including a root simulation object and a plurality of other simulation objects, one or more of the simulation objects other than the root simulation object comprising a child simulation object with respect to a parent simulation object in the hierarchy of simulation objects, each simulation object other than the root object coupled to its respectively parent simulation object by a respective individual parent-child binding that is distinct and separate from every other parent-child binding; wherein at least one of the simulation objects is a child object with respect to the root simulation object and is a parent simulation object with respect to another one of the simulation objects;

an interface, in each of the simulation objects, that communicates with each child and/or parent simulation object thereof using a single, predefined protocol utilized by the interfaces of all the simulation objects; and instructions that transmit messages between the simulation objects in accordance with a single, predefined protocol;

wherein each simulation object is individually synchronized with its child simulation objects, if any, through use of the respective parent-child binding.

15. The computer program product of claim 14, wherein each of the simulation objects other than the root simulation object corresponds to a foreign block in a subsystem model whose operation is being modeled by the parent of the simulation object; and each simulation object other than the root simulation object performs incremental simulations in accordance with commands by the parent simulation object to update the output signals generated by the corresponding foreign block in the parent simulation object's subsystem model.

16. The computer program product 14, further comprising:

a simulation module, in each simulation object, that performs an incremental simulation of a respective subsystem in accordance with a set of associated input signal values; each parent-child binding defining a source in the respective parent simulation object for each input signal associated with the respective child simulation object; and a watchdog module, in a subset of the simulation objects, that stops simulation of the respective subsystem whenever a specified condition of a specified input or output signal of the respective subsystem, other than simulation time, is satisfied and for sending a predefined set of return data to the respective parent of the simulation object whenever simulation of the respective subsystem is stopped or completed.

17. The computer program product of claim 16, further comprising:

instructions that accept a watchdog signal specification by a subset of the simulation objects in conjunction with any incremental simulation, the watchdog signal specification for a respective simulation object indicating that simulation by the respective simulation object should stop when a respective specified condition of a specified signal, other than simulation time, is satisfied.

\* \* \* \* \*